(12) United States Patent
Chanda et al.

(10) Patent No.: US 9,168,950 B1
(45) Date of Patent: Oct. 27, 2015

(54) BANKED CURVE DETECTION USING VERTICAL AND LATERAL ACCELERATION

(71) Applicant: Robert Bosch GmbH, Stuttgart (DE)

(72) Inventors: Hirak Chanda, Troy, MI (US); Marcin Kowalewski, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/490,796

(22) Filed: Sep. 19, 2014

(51) Int. Cl.
| | | |
|---|---|---|
| B62C 3/00 | (2006.01) |
| B62K 25/00 | (2006.01) |
| B62D 9/02 | (2006.01) |
| B60G 21/00 | (2006.01) |

(52) U.S. Cl.
CPC ............... *B62D 9/02* (2013.01); *B60G 21/007* (2013.01); *B60G 2400/252* (2013.01)

(58) Field of Classification Search
USPC .............. 701/36–38, 41; 104/284; 280/5.502, 280/5.509, 6.16
See application file for complete search history.

(56) References Cited

U.S. PATENT DOCUMENTS

| | | | | |
|---|---|---|---|---|
| 5,282,424 | A * | 2/1994 | O'Neill ........................ | 104/282 |
| 5,433,155 | A * | 7/1995 | O'Neill et al. ................ | 104/282 |
| 5,515,274 | A * | 5/1996 | Mine et al. ...................... | 701/38 |
| 6,185,489 | B1 * | 2/2001 | Strickler ...................... | 701/31.9 |
| 6,195,606 | B1 * | 2/2001 | Barta et al. ...................... | 701/70 |
| 6,351,694 | B1 * | 2/2002 | Tseng et al. ...................... | 701/1 |
| 7,800,487 | B2 * | 9/2010 | Miyamoto .................... | 340/442 |
| 8,423,234 | B2 * | 4/2013 | Maire .......................... | 701/31.4 |
| 8,571,741 | B2 * | 10/2013 | El Fassi et al. .................. | 701/23 |
| 2003/0163237 | A1 | 8/2003 | Kim | |
| 2006/0184301 | A1 | 8/2006 | Konno et al. | |
| 2008/0086251 | A1 | 4/2008 | Lu et al. | |
| 2009/0312907 | A1 * | 12/2009 | Pothin ............................ | 701/38 |
| 2011/0029180 | A1 * | 2/2011 | El Fassi et al. ................. | 701/23 |
| 2011/0288693 | A1 | 11/2011 | Niewels et al. | |
| 2013/0325238 | A1 * | 12/2013 | Kato et al. ...................... | 701/22 |

FOREIGN PATENT DOCUMENTS

| | | |
|---|---|---|
| EP | 0769701 | 4/1997 |
| EP | 1880875 B1 * | 9/2012 |

(Continued)

OTHER PUBLICATIONS

An accurate and efficient approximation to the normal gravity; Hsu, D.Y.; Position Location and Navigation Symposium, IEEE 1998 Year: 1998; pp. 38-44, DOI: 10.1109/Plans.1998.669866.*

(Continued)

*Primary Examiner* — Cuong H Nguyen
(74) *Attorney, Agent, or Firm* — Michael Best & Friedrich LLP

(57) ABSTRACT

A banked curve detection system determines the presence of a vehicle on a banked curve by sensing a vertical acceleration and a lateral acceleration of a vehicle. A banked curve is determined when the vertical acceleration and lateral acceleration are each greater than previously sensed vertical and lateral accelerations, the lateral acceleration is less than an expected reference lateral acceleration value, and the vertical acceleration is greater than gravity. The reference lateral acceleration value is based on yaw rate, steering angle, and wheel speed. When the acceleration conditions are met, the electronic stability control adjusts the parameters due to the vehicle being driven on a banked curve. Once the acceleration condition is no longer valid, the electronic stability control returns to normal operation.

20 Claims, 3 Drawing Sheets

(56) References Cited

FOREIGN PATENT DOCUMENTS

| JP | 02008024119 A | * | 2/2008 |
| JP | 2010152923 | | 7/2010 |
| WO | WO9724582 A1 | * | 7/1997 |
| WO | 02/20318 | | 3/2002 |

OTHER PUBLICATIONS

Rollover Risk Prediction of Heavy Vehicle Using High-Order Sliding-Mode Observer: Experimental Results; Imine, H.; Benallegue, A.; Madani, T.; Srairi, S.; Vehicular Technology, IEEE Transactions on; Year: 2014, vol. 63, Issue: 6; pp. 2533-2543, DOI: 10.1109/TVT.2013.2292998.*

D. Cebon, "Interaction between heavy vehicles and roads," Soc. Autom., Eng., Warrendale, PA, USA, SP-931, 1993.*

D. Hyun and R. Langari, Summary of "Modeling to predict rollover threat of tractor-semitrailers", Veh. Syst. Dyn., vol. 39, No. 6, pp. 401-414, Jun. 2003.*

H. Imine, Y. Delanne, and N. K. M'Sirdi, "Road profiles inputs estimation in vehicle dynamics simulation," Int. J. Veh. Syst. Dyn., vol. 44, No. 4, pp. 285-303, Apr. 2006.*

B. Jacob and V. Dolcemascolo, "Dynamic interaction between instrumented vehicles and pavements," in Proc. 5th Int. Symp. Heavy Veh.; Weights Dimensions, Maroochydore, QLD, Australia, Mar. 29-Apr. 2, 1998, pp. 142-160.*

H. Imine and V. Dolcemascolo, "Rollover risk prediction of heavy vehicle in interaction with infrastructure," Int. J. Heavy Veh. Syst., vol. 14, No. 3, pp. 294-307, 2007.*

Doctoral Dissertation of Erik Dahlberg, Commercial Vehicle Stability—Focusing on Rollover, Vehicle Dynamics, Deppartment of Vehicle Engineering, Royal IUnstitute of Technology, Stockholm 2001, Sweden. (TRITA-FKT 2001:09 ISSN 1103-470X ISRN KTH/FKT/D--01/09--SE).*

OpenStax College, "Centripetal Force," last edited by OSC Physics Maintainer on Oct 21, 2013, article accessed on Jun. 23, 2014 (16 pages).

* cited by examiner

BANKED CURVE DETECTION USING VERTICAL AND LATERAL ACCELERATION

BACKGROUND

The present invention relates to a method and apparatus for detecting a banked curve driving condition to maintain operation of an electronic stability control of a vehicle driven thereon.

An electronic stability control (ESC) detects vehicle conditions and provides stability control to prevent vehicle rollovers, reduce skidding and maintain vehicle control during turning. In instances where a vehicle is driven on a banked curve, however, acceleration values and other information provided to the ESC does not conform to expected values. Thus, the ESC typically is not fully operative under such conditions.

FIG. 1 shows a vehicle 20 provided on a banked curve 22 that has a banked curve at an angle α relative to horizontal. The banked curve 22 also has a banked curve radius R (sharpness of the turn of a road of the banked curve) that is not capable of illustration in FIG. 1 and defines the degree of the curve. "V" in FIG. 1 represents vehicle velocity and "g" represents gravity (acceleration of about 9.8 meters/second). Without the vehicle 22 being located on the banked curve, lateral velocity of the vehicle is $V^2/R$. When the vehicle 20 is on the banked curve at angle α, the lateral acceleration is $(V^2 \cos(\alpha)/R) - g \sin(\alpha)/R$, which always has a value less than $V^2/R$. Thus, for a vehicle 20 on a banked curve 22, lateral acceleration is always less than expected on a flat horizontal surface due to the banked surface. Further, vertical acceleration for a vehicle 20 traveling on a banked curve 22 is greater than expected for most vehicle speeds that are driven on banked roads, relative to a vehicle not provided with a banked curve. Vertical acceleration of the vehicle is defined as vertical to the road surface and vehicle. Thus, vertical acceleration is not in the direction of gravity as on an unbanked road. As shown in FIG. 1, the vertical acceleration is $g \cos(\alpha)/R + V^2 \sin(\alpha)/R$. Due to the additional component from the lateral acceleration, the vertical acceleration for the vehicle 20 in a banked curve 22 is greater than the value g. Therefore, when both the angle α and the bank curve radius R is known, along with the easily measured vehicle velocity, direct calculations result in values for lateral acceleration and vertical acceleration. Moreover, when driving in a banked curve, the vertical acceleration is almost always greater than the typical vertical acceleration g and the lateral acceleration is less than the typical lateral acceleration expected for the particular driving speed, yaw rate, steering angle and other measureable operating values.

In a vehicle operating system, values for the banked curve angle α of a road and for the banked curve radius R are not easily determined. Therefore, the invention is directed to a cost effective approach for determining that a vehicle is being driven on a banked curve, without requiring sensing or calculating values for banked curve angle α and/or for banked curve radius R.

SUMMARY

In one embodiment, the invention provides a method for determining that a vehicle is entering a banked curve, comprising: determining a reference lateral acceleration value for the vehicle based on parameters that do not include lateral acceleration; sensing a vertical acceleration for the vehicle; sensing a lateral acceleration for the vehicle; and determining and indicating that the vehicle is entering a banked curve by: determining whether the vertical acceleration is greater than a previous vertical acceleration and whether the lateral acceleration is greater than a previous lateral acceleration; determining whether the vertical acceleration is greater than a constant vertical acceleration value; determining whether the lateral acceleration is less than a threshold percentage of the reference lateral acceleration value; and providing a banked curve signal indicating that the vehicle is entering a banked turn when: 1) the sensed vertical and lateral acceleration are greater than the previously sensed vertical and lateral acceleration, 2) the vertical acceleration is greater than the constant vertical acceleration value, and 3) the lateral acceleration is less than the threshold percentage of the reference lateral acceleration value.

In some embodiments, parameters for determining the reference lateral acceleration value comprise yaw rate, steering angle and wheel speed values of the vehicle. A yaw rate sensor on the vehicle provides the yaw rate and a steering angle sensor on the vehicle provides the steering angle. Wheel speed values are provided by wheel speed sensors.

In some embodiments, the method includes shifting the vertical acceleration and the lateral acceleration when a new vertical acceleration and a new lateral acceleration are sensed; determining whether the new vertical acceleration is greater than the shifted vertical acceleration and whether the new lateral acceleration is greater than the shifted lateral acceleration; determining whether the new vertical acceleration signal is greater than the constant vertical acceleration value; determining whether the new lateral acceleration is less than a threshold percentage of the reference lateral acceleration value; and providing the banked curve signal when: 1) the new vertical and lateral acceleration are greater than the shifted vertical and lateral acceleration, 2) the new vertical acceleration is greater than the constant vertical acceleration value, and 3) the new lateral acceleration is less than the threshold percentage of the reference lateral acceleration value, occur a predetermined number of times.

In another embodiment, the invention provides a banked curve detection system for determining operation of a vehicle in a banked curve to maintain operation of an electronic stability control comprising: a vertical acceleration sensor secured to the vehicle for sensing a vertical acceleration of the vehicle; a lateral acceleration sensor secured to the vehicle for sensing a lateral acceleration of the vehicle; and a processor and a memory, the memory storing instructions that, when executed by the processor, cause the system to: determine a reference lateral acceleration value for the vehicle based on parameters that do not include lateral acceleration; determine whether the vertical acceleration is greater than a previous vertical acceleration and whether the lateral acceleration is greater than a previous lateral acceleration; determine whether the vertical acceleration is greater than a constant vertical acceleration value; determine whether the lateral acceleration is less than a threshold percentage of the reference lateral acceleration value; and provide a banked curve signal indicating that the vehicle is entering or on a banked turn when: 1) the sensed vertical and lateral acceleration are greater than the previously sensed vertical and lateral acceleration, 2) the vertical acceleration is greater than the constant vertical acceleration value, and 3) the lateral acceleration is less than the threshold percentage of the reference lateral acceleration value.

In another embodiment, the invention provides a method for determining that a vehicle is entering a banked curve, comprising: determining a reference lateral acceleration value for the vehicle based on parameters that do not include lateral acceleration and include steering angle; sensing a vertical acceleration for the vehicle and shifting the vertical acceleration and sensing another vertical acceleration; sensing a lateral acceleration for the vehicle and shifting the lateral acceleration and sensing another lateral acceleration; and determining whether the sensed vertical acceleration is greater than a previously shifted vertical acceleration and whether the lateral acceleration is greater than a previously shifted lateral acceleration; determining whether the vertical acceleration is greater than a constant vertical acceleration value corresponding to gravity; determining whether the lateral acceleration is less than a threshold percentage of the reference lateral acceleration value; incrementing a counter when 1) the sensed vertical and lateral acceleration are greater than the shifted vertical and lateral acceleration, 2) the sensed vertical acceleration is greater than the constant vertical acceleration value, and 3) the sensed lateral acceleration is less than the threshold percentage of the reference lateral acceleration value; and decrementing the counter when at least one of the sensed vertical acceleration is not greater than the constant vertical acceleration value and the sensed lateral acceleration is not less than or equal to the threshold percentage of the reference lateral acceleration value.

In some embodiments, the method includes setting a flag indicating that the vehicle is in a banked curve when the incremented value of the counter is greater than N2 and setting the flag indicating that the vehicle is not in a banked curve when the incremented value of the counter is less than N1.

In some embodiments, the value N2 stored for use by the counter equals at least 4, the threshold percentage is about 70% and the constant vertical acceleration value is about 9.8 meters/second.

Other aspects of the invention will become apparent by consideration of the detailed description and accompanying drawings.

BRIEF DESCRIPTION OF THE DRAWINGS

Prior art

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
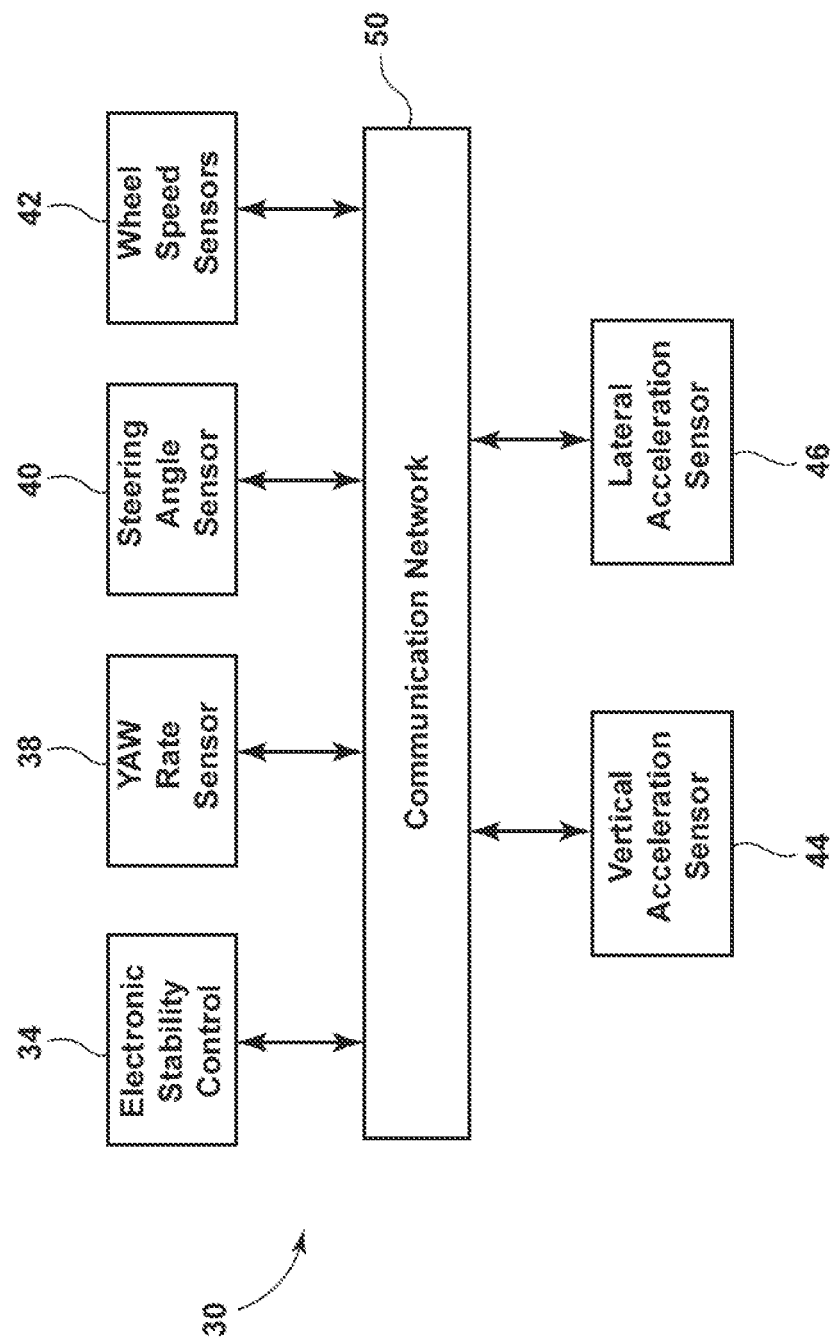
FIG. 2 shows a block diagram of a banked curve detection system.

The banked curve detection system 30 shown in FIG. 2 includes an electronic stability control (ESC) 34. The ESC 34 operates to control the stability of the vehicle and includes a processor and memory. The ESC 34 is known to minimize skidding, to prevent vehicle roll-over and to otherwise stabilize operation of a vehicle.

The banked curve detection system 30 includes a yaw rate sensor 38, a steering angle sensor 40 and wheel speed sensors 42. The yaw rate sensor 38 detects under steer and over steer of the vehicle. Typically, the wheel speed sensors 42 have sensing devices provided for each wheel of a vehicle.

Figure 1:
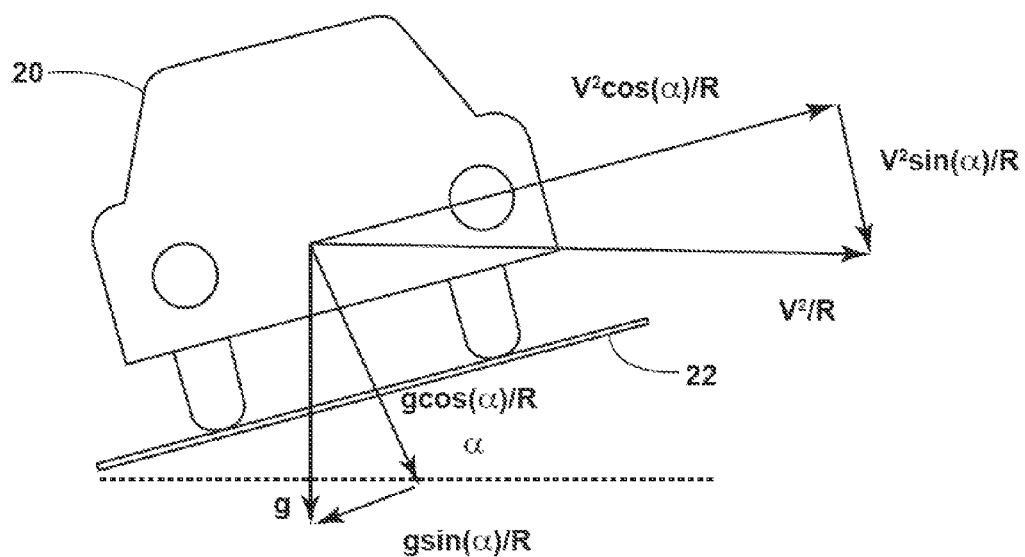
FIG. 1 shows a diagram of a vehicle provided on a banked curve.

The banked curve detection system 30 shown in FIG. 2 further includes a vertical acceleration sensor 44 and a lateral acceleration sensor 46. While shown as two separate boxes in FIG. 2, in some embodiments the acceleration sensors 44, 46 are disposed in a common housing. As set forth above with respect to the arrangement shown in FIG. 1, the lateral acceleration is determined horizontal with respect to the surface of the banked road and the vertical acceleration is oriented vertically with respect to the surface of the banked road.

Finally, the ESC 34 receives information from the sensors 38, 40, 42, 44, 46 of the banked curve detection system 30, which communicate via a communication network 50. The communication network 50 is a CAN bus, a Flex-Ray bus or other communication arrangement.

More specifically, the yaw rate sensor senses a yaw rate for the vehicle and the steering angle sensor 40 senses a vehicle steering angle. The yaw rate and steering angle α re provided to the ESC 34 over the network 50. Further, the wheel speed sensors 42 sense vehicle wheel speeds and provide same to the ESC 34. The ESC 34 calculates a reference lateral acceleration value ($A_{yref}$) from the yaw rate, the steering angle and the wheel speeds. The reference lateral acceleration value $A_{yref}$ is based on a known equation that does not account or adjust for a vehicle being driven in a banked curve.

Likewise, the ESC 34 receives a raw vertical acceleration value from the vertical acceleration sensor 44. The ESC 34, if necessary, includes a sensor offset for the vertical acceleration sensor 44. The sensor offset is subtracted from the raw vertical acceleration to compensate for sensor drift resulting in a vertical acceleration value ($A_{zs}$).

The ESC 34 also receives a raw lateral acceleration value from the lateral acceleration sensor 46 and subtracts a sensor offset to compensate for sensor drift, if necessary, and thus obtains a lateral acceleration value ($A_{ys}$).

Figure 3:
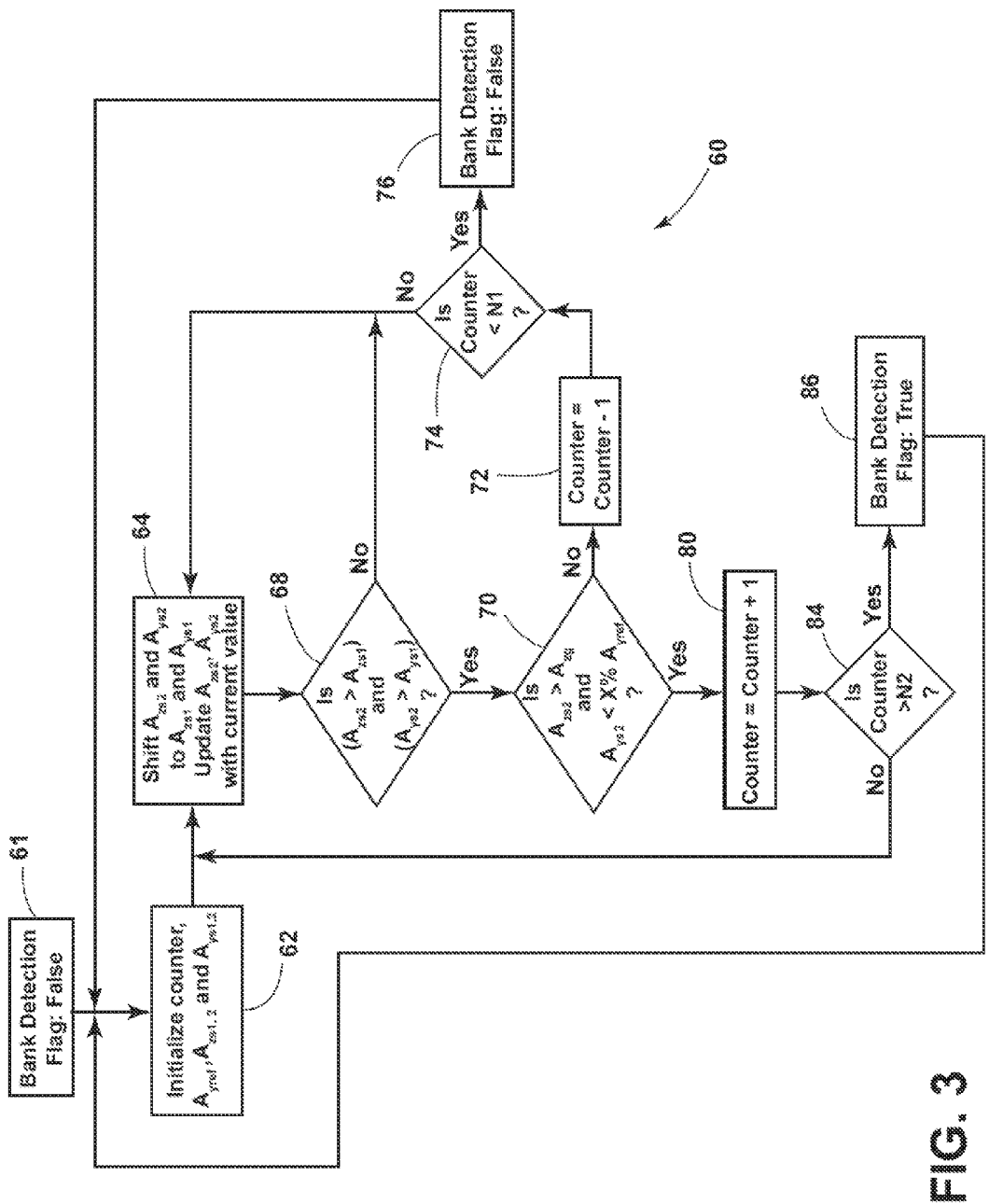
FIG. 3 shows a flow chart for sensing and determining that a vehicle is being driven on a banked curve.

Operation of the banked curve detection system 30 of FIG. 2 is set forth in the flowchart 60 of FIG. 3. The flowchart 60 is one of a plurality of simultaneous operations or algorithms that are executed by the processor and memory of the ESC 34.

At step 61 a banked road detection flag or signal is set to "False", meaning the vehicle is not on a banked road. After this default condition, the flowchart 60 advances to step 62.

At step 62 of FIG. 3, a counter of the ESC 34 is initialized to a zero value and values for lateral acceleration $A_{ys}$ and vertical acceleration $A_{zs}$ are sensed as set forth above. The acceleration values are stored in the memory of the ESC 34. The ESC 34 also calculates and stores the value for acceleration $A_{yref}$. The ESC 34 of the banked curve detection system 30 then advances to step 64.

At step 64, the ESC 34 stores the previous measured values of $A_{ys}$ and $A_{zs}$ as $A_{ys1}$ and $A_{zs1}$. Essentially simultaneously, ESC 34 determines new values for lateral acceleration $A_{ys2}$ and the vertical acceleration $A_{zs2}$. The new values are typically obtained in milliseconds or more quickly. The program then advances to decision step 68.

At decision step 68, the ESC 34 determines whether $A_{zs2} > A_{zs1}$ and $A_{ys2} > A_{ys1}$. If the most recent values for vertical acceleration and lateral acceleration are not greater than the previous values, entering a banked curve is not present, and the program returns to step 64. At step 64, the vertical acceleration value for $A_{zs2}$ is shifted to $A_{zs1}$ and a new value for vertical acceleration $A_{zs2}$ is determined. Again, at step 64, a lateral acceleration for $A_{ys2}$ is shifted to $A_{ys1}$ and a new vertical acceleration $A_{ys2}$ is determined. The algorithm then returns to step 68.

In this instance, at decision step 68, the vertical acceleration value $A_{zs2} > A_{zs1}$ and the lateral acceleration value $A_{ys2} > A_{ys1}$. Thus, lateral and vertical acceleration are both increasing and the ESC 34 advances to decision step 70.

At decision step 70, the ESC 34 determines whether the vertical acceleration value $A_{zs2}$ is > a known constant acceleration value $A_{zg}$. $A_{zg}$ corresponds to gravity, which is about 9.8 m/second$^2$. The measured or determined value of $A_{zs2}$ is greater than the acceleration of gravity when a vehicle is entering or driving on a banked curve.

At decision step 70, the algorithm executed by the ESC 34 also determines whether the lateral acceleration $A_{ys2}$ is <X %×$A_{yref}$, wherein $A_{yref}$ is the reference lateral acceleration value calculated as discussed above. In one embodiment, the value of constant X is 70. Thus, the value of the lateral acceleration $A_{ys2}$ must be less than the threshold percentage 70% of the reference lateral acceleration value $A_{yref}$. In some embodiments, the lateral acceleration $A_{ys2}$ must be within a threshold percentage range of 30% and 70% of the reference lateral acceleration value $A_{yref}$. Other ranges, such as a threshold percentage range of 20% to 80% are contemplated. In the instance wherein one or both of the above conditions for the vertical acceleration and lateral acceleration are not met, the ESC 34 advances to step 72. At step 72, a counter is decremented by −1 and the program advances to decision step 74.

At decision step 74, the value of the decremented counter stored in the memory of the ESC 34 is compared to a negative predetermined or programmed constant value N1. If the counter does not have a negative value that is even less than the negative value N1, the program returns to step 64 and again repeats steps 64 and 68.

If at decision step 74, the value of the counter is more negative than the value N1, the program advances to step 76. At step 76 there is a determination that there is no banked curve and a signal or flag: "False" is set to indicate the vehicle is not on a banked curve. Thereafter, the program returns to beginning step 62. At step 62 the counter is re-initialized or cleared, typically to a zero value.

Returning to step 70, if the vertical acceleration value $A_{zs2}$ is greater than gravity $A_{zg}$ and the lateral acceleration value $A_{ys2}$ is less than the threshold percentage of 70% of the calculated reference lateral acceleration value $A_{yref}$, the program advances to step 80. At step 80, the counter of the ESC 34 is incremented. After incrementing the counter and storing the incremented value, the program advances to decision step 84.

At decision step 84, the ESC 34 determines if the incremented counter has a value greater than the positive counter value N2. To obtain a value greater than N2 for the counter, the acceleration values must be such that the program executed via steps 64, 68, 70, 80 a predetermined number of times without diverging to step 72 and decrementing the counter enough times to offset the incrementing of the counter. If the incremented counter is not greater than N2, the program returns to step 64. If the counter is incremented to a value that is greater than N2, the program advances to step 86.

At step 86, the ESC 34 sets a stored signal or flag to bank curve detection: "True". Thus, the vehicle is considered to be driving on a banked curve. Operation of the ESC 34 is altered to account for the vehicle operating on the banked curve. Once a flag stored in memory is set to "True", the algorithm reinitializes at step 62 and operates with the banked curve Flag set until the program advances to step 76, wherein the flag set to "False" as the bank curve is no longer detected. Thereafter, the ESC 34 operates as though the vehicle is not being driven on a banked curve and no adjustments are made for the typical driving state.

The flowchart of FIG. 3 is for purposes of explanation. In some embodiments, the order of the steps of the flowchart of FIG. 3 is different. FIG. 3 shows one arrangement of the invention.

In some embodiments, the above described banked curve detection system is an algorithm or computer program provided with an ESC 34 that includes other ESC programs for stabilizing vehicle operation.

In some embodiments, part of or all of the banked curve detection system is provided in a separate electronic control unit (ECU). Such an ECU provides control signals to the ESC 34.

Thus, the invention provides, among other things, a method and system for determining that a vehicle is being driven in a banked curve to ensure proper operation of an ESC. Various features and advantages of the invention are set forth in the following claims.

What is claimed is:

1. A method for determining that a vehicle is entering a banked curve, comprising:
   determining a reference lateral acceleration value for the vehicle based on parameters that do not include lateral acceleration;
   sensing a vertical acceleration for the vehicle;
   sensing a lateral acceleration for the vehicle; and
   determining and indicating that the vehicle is entering a banked curve by:
      determining whether the vertical acceleration is greater than a previous vertical acceleration and whether the lateral acceleration is greater than a previous lateral acceleration;
      determining whether the vertical acceleration is greater than a constant vertical acceleration value;
      determining whether the lateral acceleration is less than a threshold percentage of the reference lateral acceleration value; and
      providing a banked curve signal indicating that the vehicle is entering a banked turn when: 1) the sensed vertical and lateral acceleration are greater than the previously sensed vertical and lateral acceleration, 2) the vertical acceleration is greater than the constant vertical acceleration value, and 3) the lateral acceleration is less than the threshold percentage of the reference lateral acceleration value.

2. The method according to claim 1, wherein the parameters for determining the reference lateral acceleration value comprise yaw rate, steering angle and wheel speed values of the vehicle.

3. The method according to claim 2, including:
   receiving the yaw rate from a yaw rate sensor provided on the vehicle;
   receiving the steering angle from a steering angle sensor provided on the vehicle; and
   receiving the wheel speed values for the wheels of the vehicle from wheel speed sensors.

4. The method according to claim 1, wherein the constant vertical acceleration is about 9.8 meters/second$^2$.

5. The method according to claim 1, comprising repeating the steps of:
   shifting the vertical acceleration and the lateral acceleration when new vertical acceleration and new lateral acceleration are sensed;
   determining whether the new vertical acceleration is greater than the shifted vertical acceleration and whether the new lateral acceleration is greater than the shifted lateral acceleration;
   determining whether the new vertical acceleration signal is greater than the constant vertical acceleration value;
   determining whether the new lateral acceleration is less than a threshold percentage of the reference lateral acceleration value; and providing the banked curve signal when: 1) the new vertical and lateral acceleration are greater than the shifted vertical and lateral acceleration, 2) the new vertical acceleration is greater than the constant vertical acceleration value, and 3) the new lateral acceleration is less than the threshold percentage of the reference lateral acceleration value, occur a predetermined number of times.

6. The method according to claim 5, wherein each of: 1) the new vertical and lateral acceleration being greater than the shifted vertical and lateral acceleration, 2) the new vertical acceleration being greater than the constant vertical acceleration value, and 3) the new lateral acceleration being less than the threshold percentage of the reference lateral acceleration value must occur N2 times more than: times that either or both of the vertical acceleration value being less than the constant vertical acceleration value, and the new lateral acceleration being less than the threshold percentage of the reference lateral acceleration value, occurs.

7. The method according to claim 6, wherein the threshold percentage is about 70% and N2 comprises at least four times.

8. The method according to claim 6, wherein n is an integer value stored in a counter of a processor, and wherein the method includes the step of initializing n to zero in the counter before beginning an algorithm to execute the method, and wherein the processor executes method the steps.

9. The method according to claim 5, including determining the reference lateral acceleration value each time that the vertical acceleration and the lateral acceleration are shifted.

10. A banked curve detection system for determining operation of a vehicle in a banked curve to maintain operation of an electronic stability control, the system comprising:
  a vertical acceleration sensor secured to the vehicle for sensing a vertical acceleration of the vehicle;
  a lateral acceleration sensor secured to the vehicle for sensing a lateral acceleration of the vehicle; and
  a processor and a memory, the memory storing instructions that, when executed by the processor, cause the system to:
    determine a reference lateral acceleration value for the vehicle based on parameters that do not include lateral acceleration;
    determine whether the vertical acceleration is greater than a previous vertical acceleration and whether the lateral acceleration is greater than a previous lateral acceleration;
    determine whether the vertical acceleration is greater than a constant vertical acceleration value;
    determine whether the lateral acceleration is less than a threshold percentage of the reference lateral acceleration value; and
    provide a banked curve signal indicating that the vehicle is entering or on a banked turn when: 1) the sensed vertical and lateral acceleration are greater than the previously sensed vertical and lateral acceleration, 2) the vertical acceleration is greater than the constant vertical acceleration value, and 3) the lateral acceleration is less than the threshold percentage of the reference lateral acceleration value.

11. The system according to claim 10, further comprising:
  a yaw rate sensor for sensing a yaw rate for the vehicle;
  a steering angle sensor for sensing a steering angle for the vehicle; and
  wheel speed sensors for sensing wheel speed values,
  wherein the reference lateral acceleration value is determined by the processor and the memory based on the yaw rate, the steering angle and the wheel speeds.

12. The system according to claim 10, wherein the processor executes instructions that shift the vertical acceleration and the lateral acceleration when a new vertical acceleration and a new lateral acceleration are sensed, wherein the new vertical acceleration is compared with the shifted vertical acceleration and the new lateral acceleration is compared with the shifted lateral acceleration for determining whether a banked curve signal is provided.

13. The system according to claim 10, wherein the threshold percentage is about 70% and the constant vertical acceleration value is about 9.8 meters/second$^2$.

14. The system according to claim 12, wherein the processor provides the banked curve signal when the new vertical acceleration and the new lateral acceleration are greater than the shifted vertical acceleration and the shifted lateral acceleration N2 times.

15. The system according to claim 14, wherein N2 equals at least 4, the threshold percentage is about 70% and the constant vertical acceleration value is about 9.8 meters/second$^2$.

16. A method for determining that a vehicle is entering a banked curve, comprising:
  determining a reference lateral acceleration value for the vehicle based on parameters that do not include lateral acceleration and include steering angle;
  sensing a vertical acceleration for the vehicle and shifting the vertical acceleration and sensing another vertical acceleration;
  sensing a lateral acceleration for the vehicle and shifting the lateral acceleration and sensing another lateral acceleration; and
  determining whether the sensed vertical acceleration is greater than the previously shifted vertical acceleration and whether the lateral acceleration is greater than the previously shifted lateral acceleration;
  determining whether the vertical acceleration is greater than a constant vertical acceleration value;
  determining whether the lateral acceleration is less than a threshold percentage of the reference lateral acceleration value;
  incrementing a counter when 1) the sensed vertical and lateral acceleration are greater than the shifted vertical and lateral acceleration, 2) the sensed vertical acceleration is greater than the constant vertical acceleration value, and 3) the sensed lateral acceleration is less than the threshold percentage of the reference lateral acceleration value; and
  decrementing the counter when at least one of the sensed vertical acceleration is not greater than the constant vertical acceleration value and the sensed lateral acceleration is not less than or equal to the threshold percentage of the reference lateral acceleration value, occurs.

17. The method according to claim 16, including setting a flag indicating that the vehicle is in a banked curve when the incremented value of the counter is greater than N2.

18. The method according to claim 16, including setting a flag indicating that the vehicle is not in a banked curve when the incremented value of the counter is less than N1.

19. The method according to claim 16, including:
  receiving a yaw rate from a yaw rate sensor provided on the vehicle;
  receiving the steering angle from a steering angle sensor provided on the vehicle; and
  receiving the wheel speed values for the wheels of the vehicle from wheel speed sensors, wherein the step of determining the reference lateral acceleration value for the vehicle is based on the steering angle, the yaw rate, and the wheel speed values of the vehicle.

20. The method according to claim 17, wherein N2 equals at least 4, the threshold percentage is about 70% and the constant vertical acceleration value is about 9.8 meters/second$^2$.

* * * * *